United States Patent [19]
Usami et al.

[11] Patent Number: 6,053,470
[45] Date of Patent: Apr. 25, 2000

[54] UNIT SUPPORT STRUCTURE OF AN ENDOSCOPIC LIGHT SOURCE APPARATUS

[75] Inventors: Junji Usami; Haruhiko Hibi, both of Tokyo, Japan

[73] Assignee: Asahi Kogaku Kogyo Kabushiki Kaisha, Tokyo, Japan

[21] Appl. No.: 09/089,384

[22] Filed: Jun. 3, 1998

[30] Foreign Application Priority Data

Jun. 10, 1997 [JP] Japan ................................. 9-151925
Jun. 12, 1997 [JP] Japan ................................. 9-154658

[51] Int. Cl.⁷ .................................................. F16M 13/00
[52] U.S. Cl. ........................................... 248/599; 248/615
[58] Field of Search ................................. 248/638, 677, 248/678, 676, 599, 615, 634

[56] References Cited

U.S. PATENT DOCUMENTS

| | | | |
|---|---|---|---|
| 3,957,127 | 5/1976 | Bouchard et al. | 248/599 |
| 4,923,158 | 5/1990 | Saisho | 248/677 X |
| 5,295,671 | 3/1994 | Nakagaki et al. | 248/638 X |
| 5,653,417 | 8/1997 | DeBarber et al. | 248/677 X |

FOREIGN PATENT DOCUMENTS 60-225532  11/1985  Japan .

*Primary Examiner*—Ramon O. Ramirez
*Attorney, Agent, or Firm*—Greenblum & Bernstein, P.L.C.

[57] ABSTRACT

In a unit support structure of an endoscopic light source apparatus, for supporting a unit disposed in an endoscopic light source apparatus on a chassis of the light source apparatus, one end side of an elastic member which is disposed in substantially parallel with the lower face of the unit is fixed to a projection piece which substantially perpendicularly projects from the lower face of the unit, and the other end side of the elastic member is fixed to a member fixed to the chassis.

18 Claims, 7 Drawing Sheets

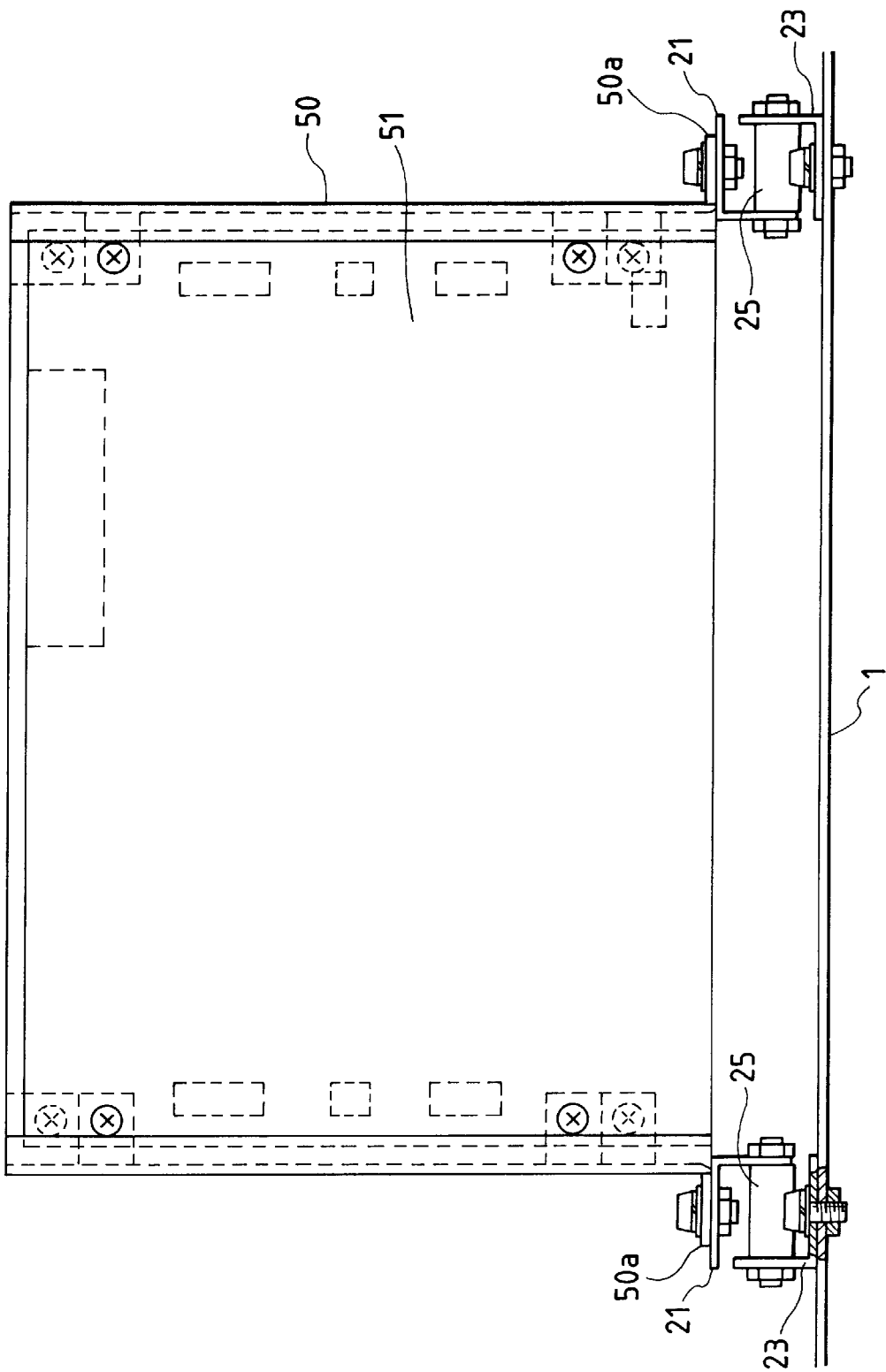

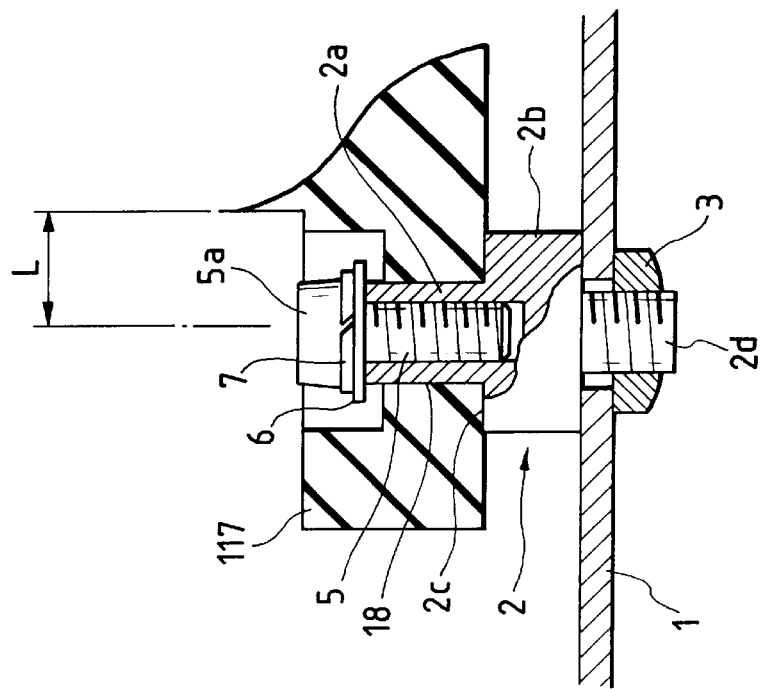
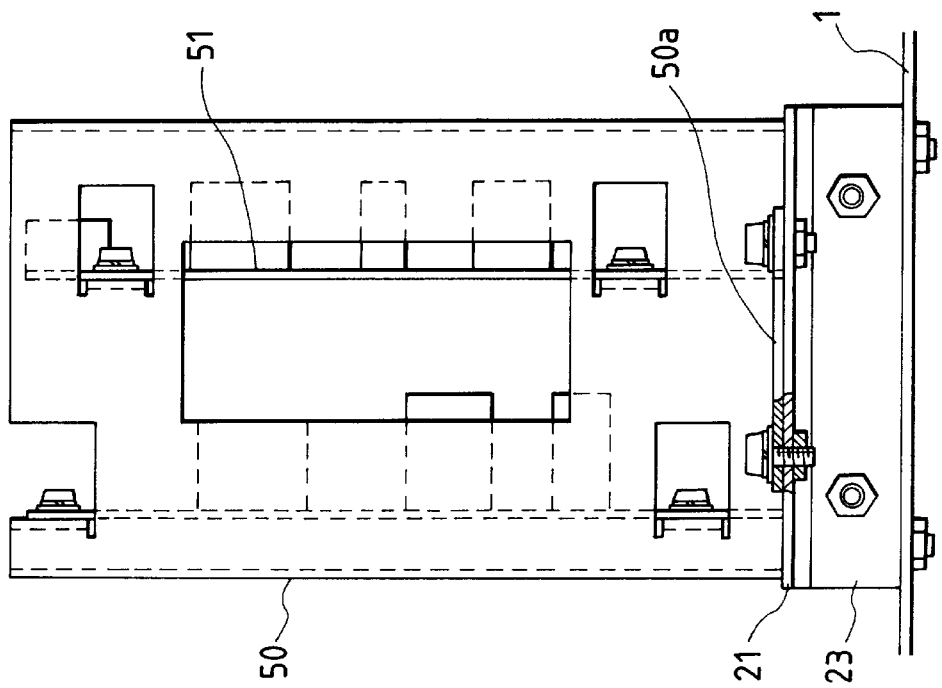

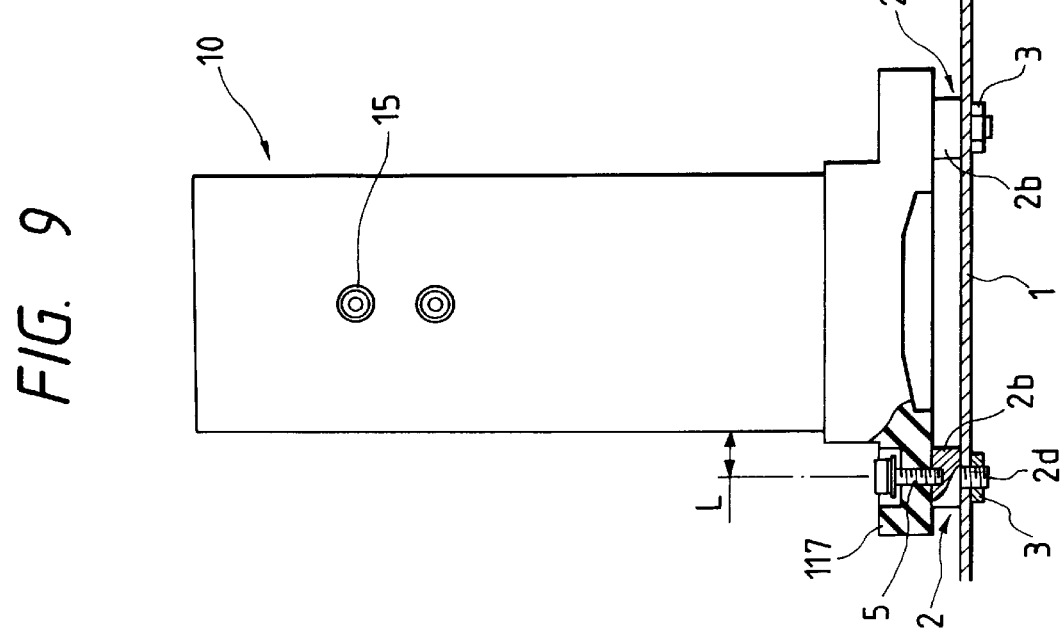
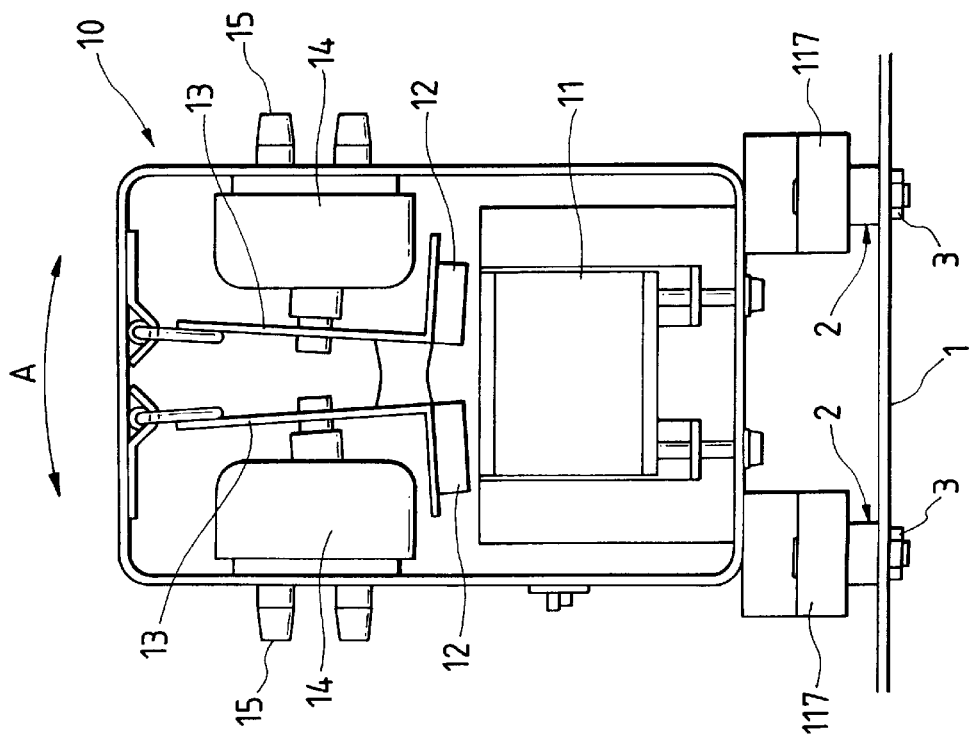

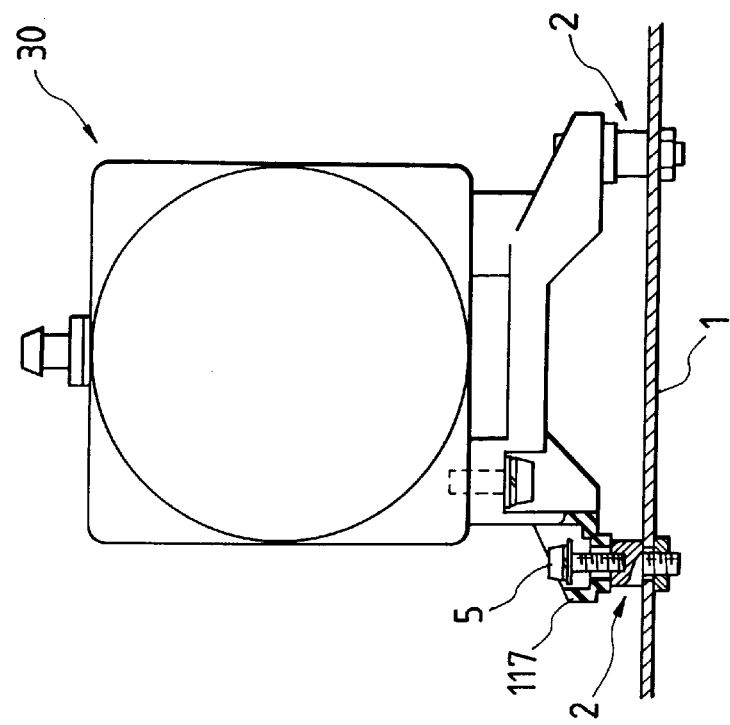
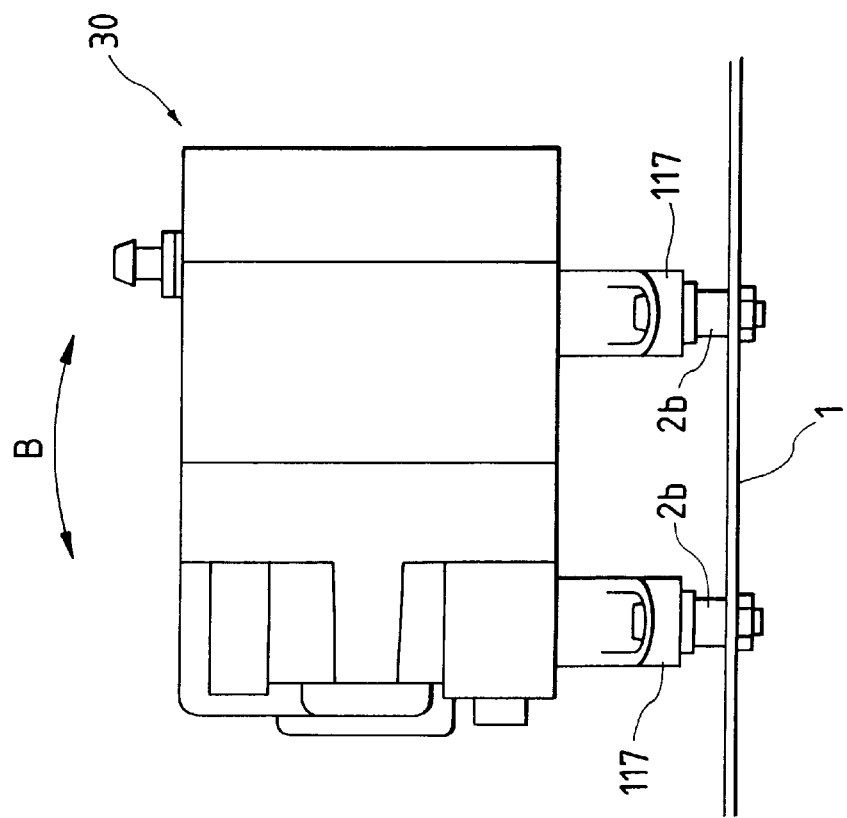

UNIT SUPPORT STRUCTURE OF AN ENDOSCOPIC LIGHT SOURCE APPARATUS

BACKGROUND OF THE INVENTION

1. Field of the Invention

The invention relates to a unit support structure of an endoscopic light source apparatus, for supporting an unit disposed in an endoscopic light source apparatus on a chassis of the light source apparatus.

2. Description of the Related Art

When the digestive organs are to be checked by using an endoscope, air must be supplied into the body cavity during the check. Usually, pressurized air for this purpose is supplied from an air supply pump unit which is incorporated into a light source apparatus.

Air supply pump units include those of the diaphragm type and the piston type. In both of the types, as shown in FIG. 12, legs 91 which are made of vibration proof rubber and which are attached to a lower face are fixed to a chassis 92 of a light source apparatus by means of screws.

During operation, however, vibration of about 50 to 60 hertz is generated, in air supply pump units of both the diaphragm type and the piston type. The vibration-proof property of vibration proof rubber in the tension and compression directions has no effect on such low-frequency vibration.

Therefore, low-frequency vibration generated in an air supply pump unit is transmitted to the chassis 92 of the light source apparatus through the legs 91. This may produce a problem in that chip devices fall off from a control circuit unit disposed in the light source apparatus. Furthermore, there is a case where fixing screws for the legs 91 are loosened by vibration.

SUMMARY OF THE INVENTION

It is a object of the invention to provide an unit support structure of an endoscopic light source apparatus in which falling of parts of the light source apparatus, loosening of screws, and the like do not occur due to low-frequency vibration generated by an incorporated air supply pump unit or the like.

According to the invention, a unit support structure of an endoscopic light source apparatus is provided for supporting an unit disposed in the endoscopic light source apparatus on a chassis of the light source apparatus. The unit support structure includes: a first projection piece which substantially perpendicularly projects from a lower face of the unit; a second projection piece which is fixed to the chassis and extends toward a unit side; and an elastic member disposed in substantially parallel with the lower face of the unit. The elastic member has one end portion attached to the first projection piece and an opposite end portion attached to the second projection piece.

Further, an another unit support structure includes: a mounting seat mounted on said chassis and including a large-diameter portion, and a small-diameter portion which is smaller in outer diameter than the large-diameter portion, the mounting seat having a step portion defined by the small-diameter portion and the large-diameter portion; a leg portion which is made of vibration proof rubber and is attached to a lower face of the unit, the leg portion defines a hole fitting with said small-diameter portion so that a lower face of said leg portion is placed on said step portion; and a locking member attached to an upper end portion of the small-diameter portion which projects from an upper face of the hole under a state where a pressure is not applied to the leg portion, the locking member preventing the upper end portion of the mounting seat from entering the hole.

The present disclosure relates to the subject matter contained in Japanese Patent Application No. Hei. 9-151925 filed on Jun. 10, 1997 and Japanese Patent Application No. Hei. 9-154658 filed on Jun. 12, 1997 which are expressly incorporated herein by reference in theirs entirety.

BRIEF DESCRIPTION OF THE DRAWINGS

FIG. 5 is a front view of a control circuit unit showing a third unit support structure of an endoscopic light source apparatus of the invention;

FIG. 6 is a side view of the control circuit unit showing the third unit support structure of an endoscopic light source apparatus of the invention;

FIG. 7 is a partial enlarged side section view of an air supply pump support portion showing a fourth unit support structure of an endoscopic light source apparatus of the invention;

FIG. 8 is a front view of an air supply pump showing a fourth unit support structure of an endoscopic light source apparatus of the invention;

FIG. 9 is a side view of the air supply pump showing a fourth unit support structure of an endoscopic light source apparatus of the invention;

FIG. 10 is a front view of an air supply pump showing a fourth unit support structure of an endoscopic light source apparatus of the invention;

FIG. 11 is a side view of the air supply pump showing a fourth unit support structure of an endoscopic light source apparatus of the invention.

EXPLANATION OF AN UNIT SUPPORT STRUCTURE OF AN ENDOSCOPIC LIGHT SOURCE APPARATUS

The explanation will be described with reference to the accompanying drawings.

Figure 2:
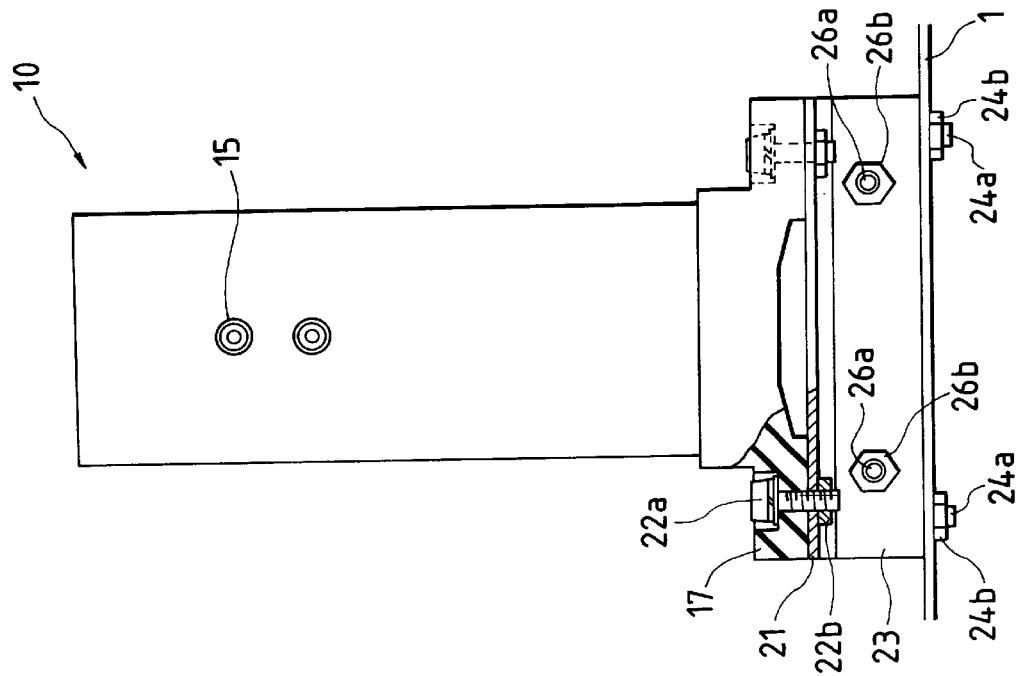
FIG. 2 is a side view of the air supply pump unit showing the first unit support structure of an endoscopic light source apparaus of the invention.
Figure 1:
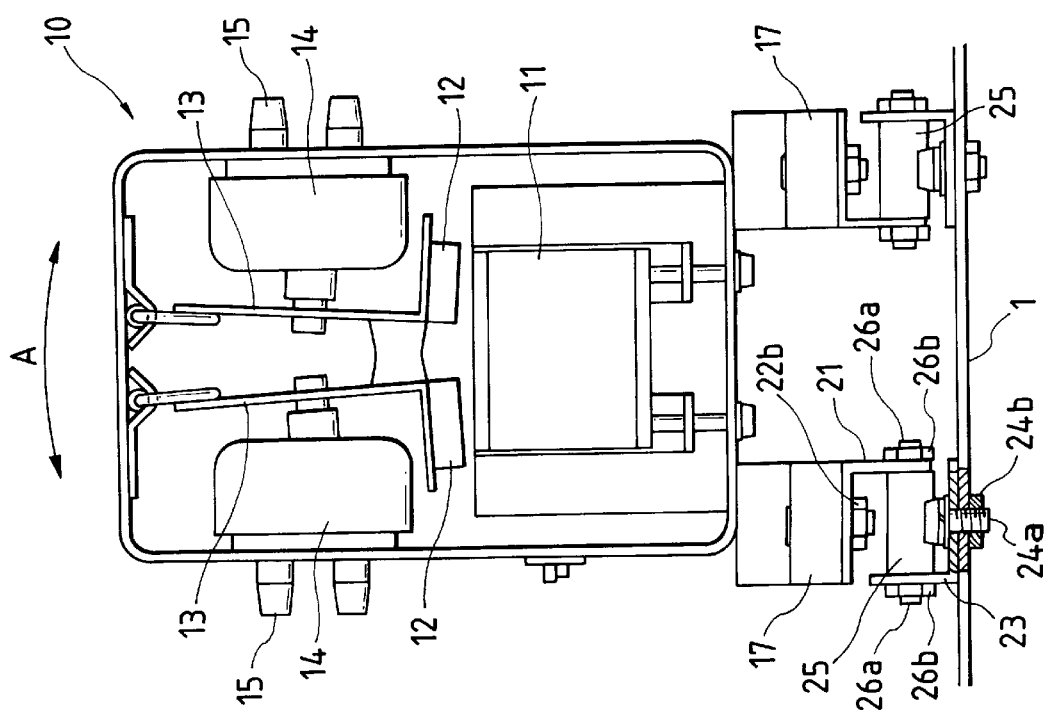
FIG. 1 is a front view of an air supply pump unit showing a first unit support structure of an endoscopic light source apparatus of the invention.

FIGS. 1 and 2 show a first unit support structure of an endoscopic light source apparatus. The first unit support structure is applied to an air supply pump unit 10 of the diaphragm type which is incorporated into the endoscopic light source apparatus. FIG. 1 is a front view, and FIG. 2 is a side view.

The air supply pump unit 10 has a pair of permanent magnets 12 that are opposed to an electromagnet 11 to which an AC current is supplied. Diaphragms 14 are driven by vibrating plates 13 coupled to the permanent magnets 12, to thereby eject pressurized air from discharge pipes 15.

As a result, during operation of the air supply pump unit 10, low-frequency vibration of about 50 to 60 hertz is generated in the direction indicated by the arrow A. The pressurized air is sent to an air supply tube of an endoscope which is not shown.

A pair of legs 17 are arranged to the lower face of the air supply pump unit 10 so as to elongate in parallel. The legs 17 are juxtaposed along the front and rear edges of the air supply pump unit 10, so as to project forward and rearward from the front and rear edges of the air supply pump unit 10, respectively.

A metal angle member 21 which has an L-like section shape is fixed to the lower face of each of the legs 17 by a bolt 22a and a nut 22b so that one of plate faces of the angle member 21 downward projects from the lower face of the air supply pump unit 10 in a substantially vertical direction.

For each of the angle members 21, an angle member 23 which is identical in shape with the angle member 21 is fixed to a chassis 1 by a bolt 24a and a nut 24b. One of plate faces of the angle member 23 that upwardly projects from a plate face of the chassis 1 in a substantially vertical direction is opposed to the one of plate faces of the angle member 21 attached to the air supply pump unit 10.

Elastic rods 25 which are made of hard rubber are disposed between the plate faces of the two opposing angle members 21 and 23 and in parallel with the lower face of the air supply pump unit 10. The end portions of each elastic rod 25 are fixed to the plate faces of the angle members 21 and 23, respectively.

The fixation of the elastic rod 25 is performed by tightening nuts 26b to thread shafts 26a which are inserted into the end portions thereof, respectively. The direction of a line connecting the fixing portions of the end portions substantially coincides with the vibration direction A of the air supply pump unit 10. Therefore, the elastic rods 25 exhibit a high vibration absorption ability.

In this way, the air supply pump unit 10 is supported on the chassis 1 under the state where each of the elastic rods 25 is used as a cantilever. The elastic rods 25 are placed in the four corners of the lower face of the air supply pump unit 10, respectively.

The spring constant of the elastic rods 25 is set to a value at which low-frequency vibration of about 50 to 60 hertz is isolated. Therefore, low-frequency vibration which is generated as a result of operation of the air supply pump unit 10 is absorbed by the elasticity of the elastic rods 25, and hence is not transmitted to the chassis 1.

Figure 4:
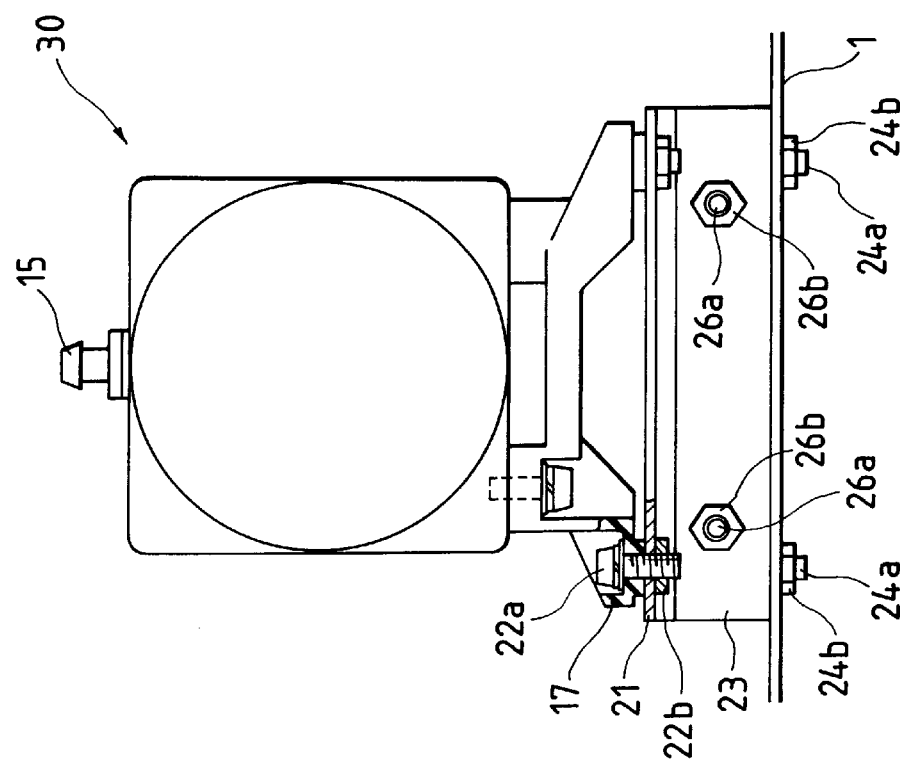
FIG. 4 is a side view of the air supply pump unit showing the second unit support structure of an endoscopic light source apparatus of the invention.
Figure 3:
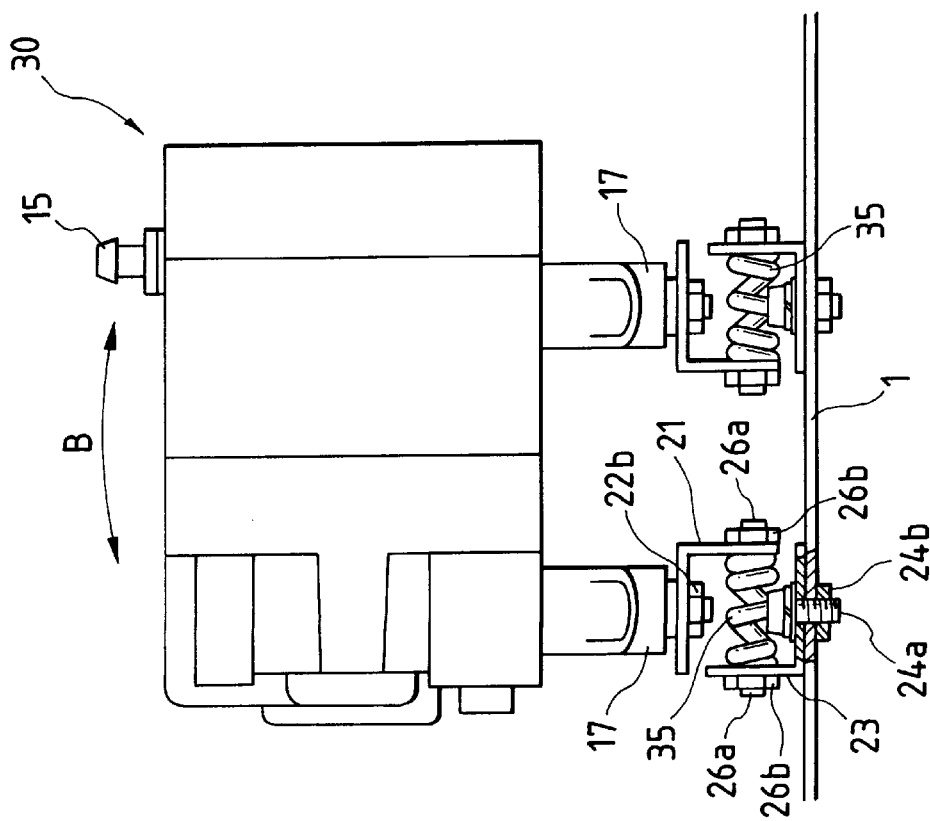
FIG. 3 is a front view of an air supply pump unit showing a second unit support structure of an endoscopic light source apparatus of the invention.
Figure 12:
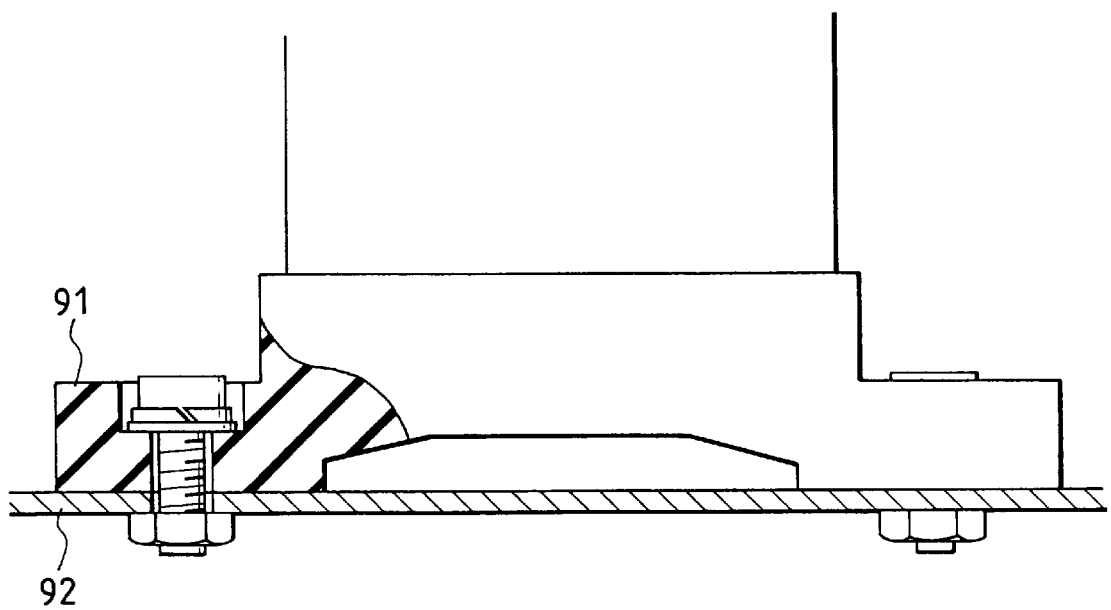
FIG. 12 is a partial enlarged side section view of a conventional air supply pump support portion.

FIGS. 3 and 4 show a second unit support structure of an endoscopic light source apparatus of the invention. The second unit support structure is applied to a support portion for an air supply pump unit 30 of the piston type in which air is pressurized by a piston. FIG. 3 is a front view, and FIG. 4 is a side view. The arrow B indicates the direction of vibration which is generated during operation of the air supply pump unit 30.

In the second unit support structure, coil springs 35 are used in place of the elastic rods 25 of the first unit support structure. The spring constant is set to a value at which low-frequency vibration of about 50 to 60 hertz is isolated, in the same manner as the elastic rods 25 of the first unit support structure.

The other components for supporting the air supply pump unit 30 on the chassis 1 are configured in the same manner as those of the first unit support structure. Therefore, the components are designated by the same reference numerals as those of the first unit support structure, and their description is omitted.

FIGS. 5 and 6 show a third unit support structure of an endoscopic light source apparatus of the invention. The third unit support structure is applied to a support portion for a rack 50 housing a control board 51 on which a control circuit of a light source apparatus is mounted. FIG. 5 is a front view, and FIG. 6 is a side view.

In the third unit support structure, a support portion for supporting the rack 50 on the chassis 1 is structured in the same manner as the first unit support structure which uses the elastic rods 25 made of hard rubber. Similarly, the spring constant of the elastic rods 25 is set to a value at which low-frequency vibration of about 50 to 60 hertz is isolated. The angle members 21 are fixed to a floor plate member of the rack 50.

According to this configuration, even when low-frequency vibration is transmitted from an air supply pump to the chassis 1, the vibration is absorbed by the elastic rods 25, so as not to be transmitted to the control board 51. Therefore, it is possible to prevent chip devices attached to the control board 51 from falling off from the board by vibration. In place of the elastic rods 25, the coil springs 35 may be used in the same manner as the second unit support structure.

FIGS. 7 to 9 show a fourth unit support structure of an endoscopic light source apparatus of the invention. The fourth unit support structure is applied to an air supply pump unit 10 of the diaphragm type which is incorporated into the endoscopic light source apparatus, as well as the first unit support structure. FIG. 8 is a front view, and FIG. 9 is a side view.

The components of the air supply pump unit 10 are configured in the same manner as those of the first unit support structure. Therefore, the components are designated by the same reference numerals as those of the first unit support structure, and their description is omitted.

A pair of legs 117 which are made of vibration proof rubber are attached to the lower face of the air supply pump 10. Mounting seats 2 which are made of a metal or plastic projects from four positions of a chassis 1 which correspond to the four corners of the air supply pump 10, respectively.

As shown in an enlarged view of FIG. 7, each of the mounting seats 2 is formed into a stepped column-like shape in which the outer diameter of the upper half portion (small-diameter portion) 2a is smaller than that of the lower half portion (large-diameter portion) 2b. A male thread portion 2d downward projects from the lower end face of the large-diameter portion 2b. The male thread portion is passed through a hole which is opened in the chassis 1, and screwed with a nut 3 in the back side of the chassis 1, whereby the mounting seat 2 is fixed to the chassis 1.

The small-diameter portion 2a of the mounting seat 2 is fittingly inserted into a hole 18 which is opened so as to vertically pass through the leg 117, so that the lower face of the leg 117 is placed on a step portion 2c of the mounting seat 2.

The upper end of the small-diameter portion 2a upward projects from the upper end opening of the hole 18 which is opened in the leg 117. A female thread is formed in a region from the upper end face of the small-diameter portion 2a toward the inner side of the mounting seat 2.

A lock washer 6 which is larger in diameter than the hole 18 is interposed between the head 5a of a bolt 5 screwed with the female thread and the upper end face of the small-diameter portion 2a. The reference numeral 7 designates a spring washer for preventing the bolt from loosening.

Therefore, the washer 6 prevents the upper end portion of the small-diameter portion 2a from entering the hole 18, without requiring the leg 117 to be tightened by means of the bolt 5. When the diameter of the head 5a of the bolt 5 is larger than that of the hole 18, the washer 6 may be omitted.

In this way, the air supply pump 10 is supported on the chassis 1 under the state where the four corners are placed on the step portions 2c of the mounting seats 2, respectively. The large-diameter portion 2b has a diameter which is as small as about 5 to 12 mm.

Therefore, the section area of the portion which supports the leg 117 on the chassis 1 is very small, so that low-frequency vibration generated in the air supply pump 10 is hardly transmitted to the chassis 1. As the projection (projection length L) of the position where the leg 117 made of vibration proof rubber is supported by the mounting seat 2 is larger, the leg 117 performs at a higher degree the same function as that of a horizontal spring so as to absorb vibration. Since the bolt 5 does not tighten the vibration proof rubber constituting the leg 117, vertical vibration of the leg 117 is not directly transmitted to the chassis 1.

FIGS. 10 and 11 show a fifth unit support structure of an endoscopic light source apparatus of the invention. The fifth unit support structure is applied to a support portion for an air supply pump unit 30 of the piston type in which air is pressurized by a piston, as well as the second unit support structure. FIG. 10 is a front view, and FIG. 11 is a side view. The arrow B indicates the direction of vibration which is generated during operation of the air supply pump unit 30.

The components for supporting the air supply pump unit 30 on the chassis 1 are configured in the same manner as those of the fourth unit support structure. Therefore, the components are designated by the same reference numerals as those of the fourth unit support structure, and their description is omitted.

The invention is not restricted to the unit support structure described above. In order to support one air supply pump, for example, at least three mounting seats 2 are requested to be disposed. Further, the mounting seats 2 applied to the fourth and fifth unit support structure may be used for a support portion of a rack housing a control board on which a control circuit of a light source apparatus is mounted, in place of the third unit support structure.

According to the invention, one end side of an elastic member which is disposed in substantially parallel with a lower face of an unit is fixed to a projection piece which substantially perpendicularly projects from the lower face of the unit, and the other end side of the elastic member is fixed to a member fixed to the chassis. Consequently, the unit is supported on the chassis under the state where the elastic member is used as a cantilever. When the spring constant of the elastic member is suitably set, therefore, low-frequency vibration can be absorbed by the elastic member. As a result, falling of parts, loosening of screws, and the like due to low-frequency vibration generated by an air supply pump unit or the like incorporated into the light source apparatus can be prevented from occurring.

Further, a leg made of vibration proof rubber which is attached to the lower face of an air supply pump is placed on a step portion of a mounting seat which is formed into a stepped shape and which projects from a chassis of a light source apparatus. Therefore, the section area of the portion which supports the leg on the chassis can be made very small, so that vibration generated in one of the air supply pump and the chassis is hardly transmitted to the other thereof. Since the vibration proof rubber of the leg in the support portion is not fastened, vibration of the leg is not directly transmitted to the chassis. Consequently, falling of parts of the light source apparatus, loosening of screws of the support portion, and the like due to vibration generated by the air supply pump do not occur.

What is claimed is:

1. A unit support structure of an endoscope light source apparatus in combination with a unit disposed in the light source apparatus and a chassis of the light source apparatus, said unit support structure supporting said unit on said chassis, said unit support structure comprising:
   a first projection piece which substantially perpendicularly projects from a lower face of said unit;
   a second projection piece which is attached to said chassis and extends toward a unit side; and
   an elastic member disposed in substantially parallel with the lower face of said unit, said elastic member having one end portion attached to said first projection piece and an opposite end portion attached to said second projection piece.

2. The unit support structure of an endoscopic light source apparatus according to claim 1, wherein a spring constant of said elastic member is set to a value at which low-frequency vibration of about 50 to 60 hertz is isolated.

3. The unit support structure of an endoscopic light source apparatus according to claim 1, wherein said elastic member is hard rubber.

4. The unit support structure of an endoscopic light source apparatus according to claim 3, further comprising:
   a thread shaft which is inserted into said end portions; and
   at least one of nuts tightening said thread shaft so as to be fixed said end portions of said elastic member between said first and second projection pieces.

5. The unit support structure of an endoscopic light source apparatus according to claim 1, wherein said elastic member is a coil spring.

6. The unit support structure of an endoscopic light source apparatus according to claim 1, wherein said first projection piece and said second projection piece are formed by a pair of members which have an L-like section shape and which are opposed to each other, so that said first and second projections are opposed in parallel to each other.

7. The unit support structure of an endoscopic light source apparatus according to claim 1, wherein said unit is an air supply pump unit.

8. The unit support structure of an endoscopic light source apparatus according to claim 1, wherein said unit is a control circuit unit.

9. The unit support structure of an endoscopic light source apparatus according to claim 1, wherein a direction of a line connecting said both end portions of said elastic member substantially coincides with a direction of vibration to be absorbed.

10. A unit support structure of an endoscope light source apparatus in combination with a unit disposed in the light source apparatus and a chassis of the light source apparatus, said unit support structure supporting said unit on said chassis, said unit support structure comprising:
    a mounting seat mounted on said chassis and including a large-diameter portion; and a small-diameter portion which is smaller in outer diameter than said large-diameter portion, said mounting seat having a step portion defined by said small-diameter portion and said large-diameter portion;
    a leg portion which is made of vibration proof rubber and is attached to a lower face of said unit, said leg portion defining a hole fitting with said small-diameter portion so that a lower face of said leg portion is placed on said step portion; and a locking member attached to an upper end portion of said small-diameter portion which projects from an upper face of said hole under a state where a pressure is not applied to said leg portion, said locking member preventing said upper end portion of said small-diameter portion form entering into said hole.

11. The unit support structure of an endoscopic light source apparatus according to claim 10, wherein said mounting seat defines a female thread formed in a region from said upper end portion toward an inner side, and said locking member is screwed with said female thread to be fixed.

12. The unit support structure of an endoscopic light source apparatus according to claim 11, wherein said locking member is a bolt, and a head of said bolt is larger in section than said small-diameter portion.

13. The unit support structure of an endoscopic light source apparatus according to claim 10, wherein said mounting seat is disposed in at least three positions of said lower face of said unit.

14. The unit support structure of an endoscopic light source apparatus according to claim 10, wherein said mounting seat is laterally projected from said lower face of said unit.

15. The unit support structure of an endoscopic light source apparatus according to claim 10, wherein said unit is an air supply pump unit.

16. The unit support structure of an endoscopic light source apparatus according to claim 10, wherein said unit is a control circuit unit.

17. A unit support structure of an endoscope light source apparatus in combination with a unit disposed in the light source apparatus and a chassis of the light source apparatus, said unit support structure supporting said unit on said chassis, said unit support structure comprising:

a leg portion which is made of vibration proof rubber and is attached to a lower face of said unit; and a mounting seat which is made of one of metal and plastic and includes a large-diameter portion being 5–12 mm in outer diameter, said large-diameter portion interposed between said leg portion and said chassis, wherein said mounting seat further includes a small-diameter portion coaxially provided with said large diameter portion and said leg portion defines a hole fitting with said small-diameter portion.

18. The unit support structure of an endoscopic light source apparatus according to claim 17, further comprising:

a locking member attached to an upper end portion of said small-diameter portion so as to prevents said upper end portion of said small-diameter portion from applying a pressure to said leg portion and entering into said hole.

* * * * *